United States Patent [19]

Strohmeyer

[11] 4,195,410
[45] Apr. 1, 1980

[54] DEVICE FOR MEASURING THE LENGTH OF A WEB

[76] Inventor: Willi Strohmeyer, Grimsehlstrasse 37, D-3352 Einbeck, Fed. Rep. of Germany

[21] Appl. No.: 846,524

[22] Filed: Oct. 28, 1977

[30] Foreign Application Priority Data

Nov. 13, 1976 [DE] Fed. Rep. of Germany ....... 2651822

[51] Int. Cl.² ............................ G01B 3/12; G01B 5/04
[52] U.S. Cl. .................................. 33/134 R; 33/141 F
[58] Field of Search ............. 33/141 F, 141 B, 134 R, 33/129, 132, 133

[56] References Cited

U.S. PATENT DOCUMENTS

| 1,022,916 | 4/1912 | Yorke | 33/134 R |
| 1,415,483 | 5/1922 | Reichmann | 33/141 F |
| 3,829,976 | 8/1974 | Moore | 33/141 F |
| 3,838,519 | 10/1974 | Chick | 33/134 R |

Primary Examiner—Steven L. Stephan
Attorney, Agent, or Firm—Michael J. Striker

[57] ABSTRACT

A device for measuring the length of a web, such as a floor covering or the like, in which the web is movable in longitudinal direction over a support surface, and in which the device includes a measuring roller or wheel adapted to be coupled with a measuring mechanism. The measuring wheel is arranged opposite the rear face of the web, turnable about an axis extending normal to the direction of movement of the web, and pressure means, rotatable about an axis parallel to that of the measuring wheel, engage the other side of the web for pressing the latter toward the peripheral surface of the measuring wheel. At least one opening in the support surface is arranged opposite the pressure means.

11 Claims, 8 Drawing Figures

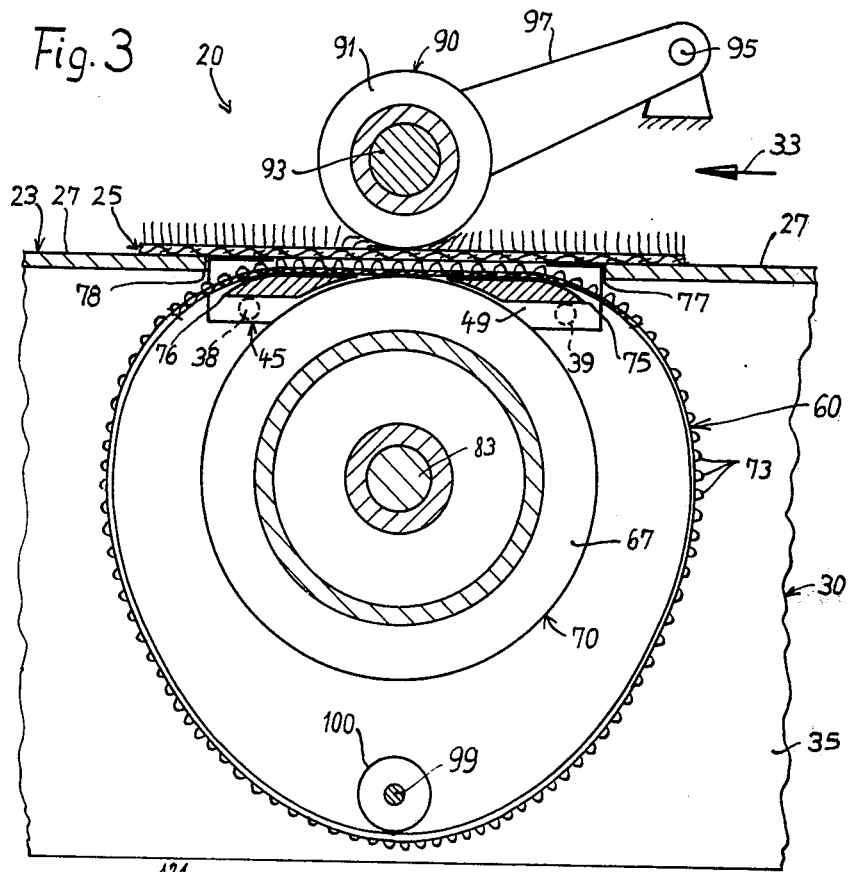
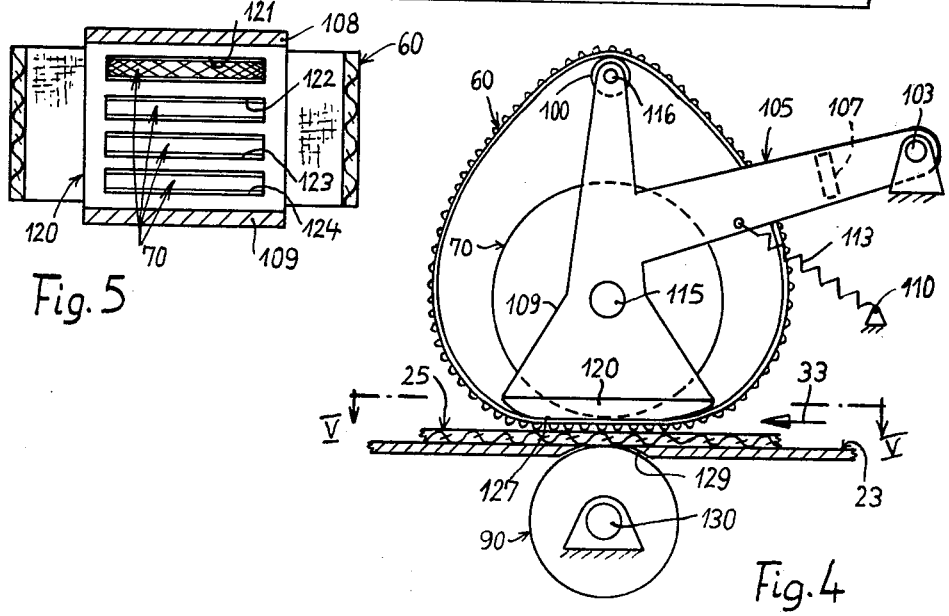

DEVICE FOR MEASURING THE LENGTH OF A WEB

BACKGROUND OF THE INVENTION

The present invention relates to a device for measuring the length of a web, for instance a floor covering, in which the web is movable in longitudinal direction over a support surface, and in which the device includes a measuring roller or wheel adapted to be coupled with a measuring mechanism. The measuring wheel is arranged opposite the rear face of the web, turnable about an axis extending normal to the direction of movement of the web. The device includes further pressure means, rotatable about an axis parallel to that of the measuring wheel, and engaging the other side of the web for pressing the latter towards the peripheral surface of the measuring wheel, and wherein at least one opening in the support surface is arranged opposite the pressure means.

In a known length measuring device of the aforementioned kind (DT-PS No. 1,278,114) the measuring wheel directly engages the rear face of the web. In this known measuring device measuring errors will occur, when the rear face of the web is extensively structured or profiled. This is for instance the case if the web is constituted by a floor covering having a rear face provided with depressions forming a waffle pattern, a fluted pattern or the like. In this case, especially if the rear face of the web is formed from elastic material, the measuring wheel will be rotated and taken along by the web in an uncontrolled and non-synchronous manner. A small curvature of the web in a region of the measuring wheel may also have a disadvantageous influence on the measuring accuracy.

SUMMARY OF THE INVENTION

It is an object of the present invention to provide a length measuring device by means of which, independent from the form and structure of the rear face of the web, an at least substantially error-free measurement of length of the web is assured.

This object is obtained according to the present invention by arranging between the measuring wheel and the rear face of the web an endless, flexible contact band. This contact band will bridge the structure on the rear face of the web and will thus assure a uniform taking along of the measuring wheel synchrone with the movement of the web and thus an exact measuring result.

In one embodiment according to the present invention, the measuring wheel is arranged on the side of a support surface, supporting the web during the movement thereof in longitudinal direction, which faces away from the web. In this construction the support surface is provided with a pair of slots for the passage of the contact band, which are respectively arranged, as considered in the direction of movement of the web, forwardly and rearwardly spaced from a plane extending normal to the support surface and including the longitudinal axis of the measuring wheel. The distance of the two slots from each other is preferably chosen in such a manner that the contact band will engage the web through a sufficiently long stretch, in order to obtain a pattern bridging action by the contact band.

According to a further characteristic of the invention a guide face for the contact band extending parallel and slightly below the above-mentioned support surface is provided between the two slots. This will provide that the contact band will engage the rear face of the web over a large surface portion of the latter, resulting in advantageous measuring results.

According to a further characteristic of the invention, the edges of the aforementioned slots which are engaged by the contact band are rounded in the direction of the curvature of the contact band. This will reduce friction between the contact band and these edges and also reduce wear of the contact band.

According to a further feature of the invention, a frame is arranged in the opening in the support surface and the frame is provided with at least one further opening, opposite the pressure means, for pressing the web into frictional engagement with the outer surface of the endless contact band and in which a portion of the measuring wheel extends through the further opening in the frame. The frame can be machined with great exactness and can also easily and quickly exchanged against another frame, when such an exchange is necessary if the frame should be used with a different measuring wheel. The frame, which constitutes a separate part, facilitates also the mounting of the contact band and permits to produce the latter as an integral, one piece loop.

According to a further feature of the invention the slots, through which the contact band passes, are defined by two transverse edges of the frame and opposite edges of the opening in the support surface. This again will facilitate the guide and mounting of the contact band.

Another embodiment according to the present invention is characterized in that the measuring wheel is arranged on the side of the support surface which is directed toward the web and in which means are provided mounting the measuring wheel movable toward and away from the support surface. In this embodiment a frame is fixed to the mounting means and has a surface constituting a guide face for the contact band. This guide face is substantially parallel to the aforementioned support surface, and the frame is provided with at least one opening for the measuring wheel, which opening is arranged opposite the aforementioned pressure means. With this construction an exact length measuring is also possible when the web is moved over the support surface with the front face of the web engaging the support surface. The frame can thereby be arranged relative to the support surface in such a manner that it will remain parallel to the latter.

According to a further feature of the present invention reversing means are provided, arranged to engage the inner surface of the contact band in the region of the latter opposite the portion thereof which engages the web. This will assure a proper guiding of the endless contact band.

Furthermore, the outer surface of the contact band and the peripheral surface of the measuring wheel are constructed to provide a high friction coefficient between the contact band and the web, on the one hand, and between the contact band and the measuring wheel, on the other hand. This will assure that no slippage will occur between the cooperating elements, which will further increase the measuring exactness derivable from the measuring device of the present invention. The contact band may, for instance, be constructed from a band of textile material provided on the opposite surfaces with a rubber layer. At least the rubber layer on the contact band, which engages the web to be measured, may be provided with a plurality of closely spaced projections. The peripheral surface of the measuring wheel, as well as that of the pressure means, may be knurled.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a cross-section taken along the line III—III of FIG. 1;

FIG. 4 is a side view of a second embodiment of the measuring device;

FIG. 5 is a cross-section taken along the line V—V, in which the web to be measured is omitted;

DESCRIPTION OF THE PREFERRED EMBODIMENTS

Figure 1:
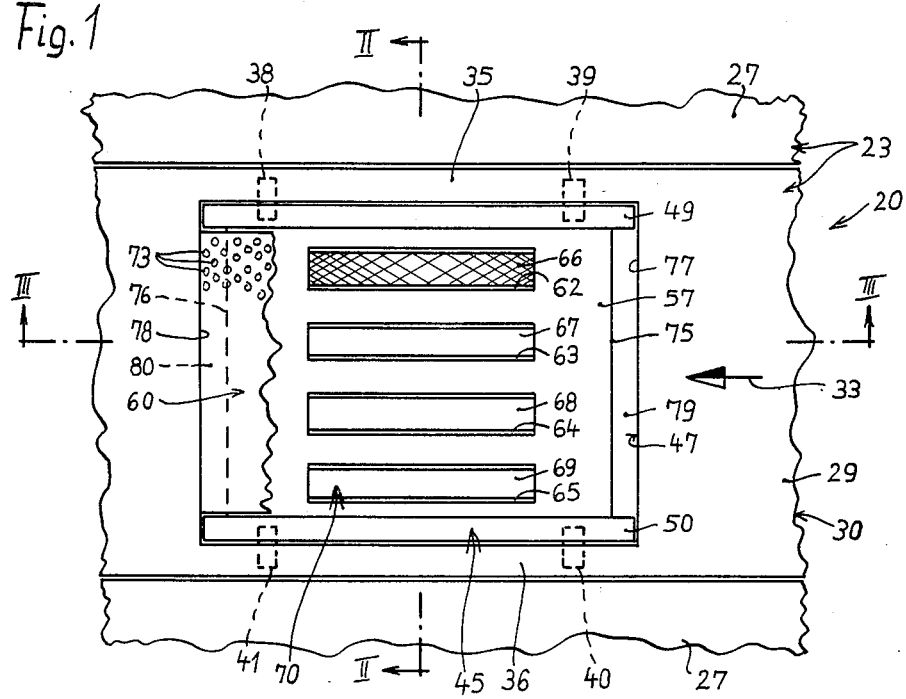
FIG. 1 is a top view of the first embodiment of a length measuring device according to the present invention as viewed in the direction of the arrows I—I shown in FIG. 2.
Figure 2:
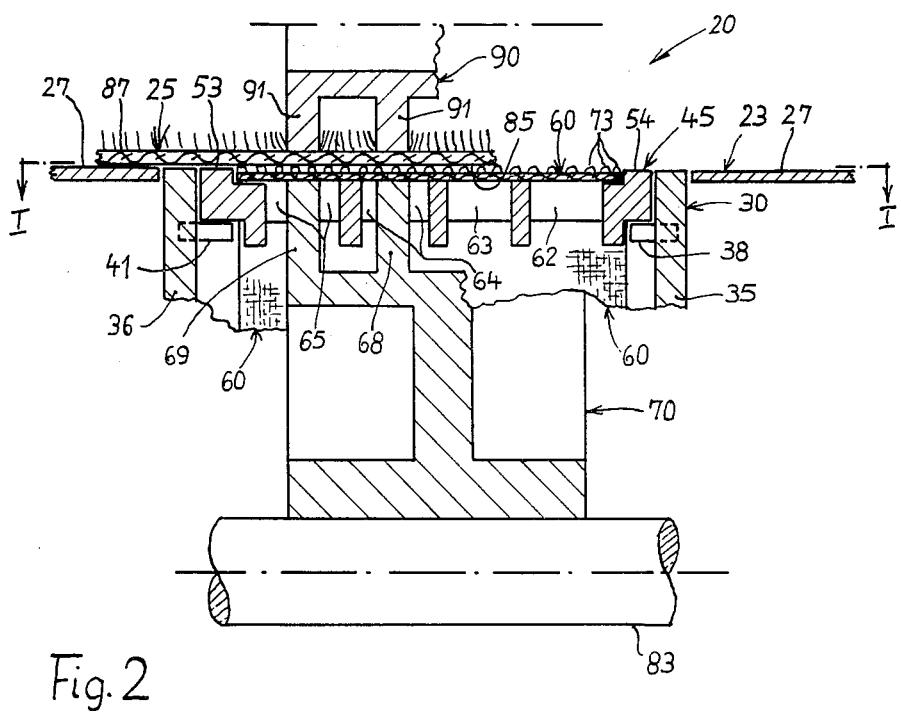
FIG. 2 is a partial section of the device shown in FIG. 1, taken along the line II—II of FIG. 1.

Referring now to the drawing, and more specifically to FIGS. 1-3, it will be seen that the length measuring device according to the present invention may have a support surface 23 for the material or web 25 the length of which has to be measured, which is in part formed by the upper surface of a table 27, only partially shown in these Figures, and the upper surface 29 of a housing 30. The material 25 to be measured may be constituted by a floor covering or the like which is moved in longitudinal direction, as indicated by the arrow 33 in FIG. 1, over the aforementioned support surface 23. This can for instance be accomplished by a reel, not shown in the drawing, on which the material 25 is wound up.

Four carrying pins 38, 39, 40 and 41, mounted in appropriate blind bores of the side walls 35 and 36 of the housing 30, project inwardly from the side walls into the interior of the housing 30, on which a frame 45 is supported. The frame 45 is closely fitted into an opening 47 provided in the top wall of the housing 30, and lateral rails 49 and 50 of the frame 45 are arranged with the upper faces 53 and 54 thereof in one plane with the support surface 23.

The frame 45 has, parallel and slightly below the support surface 23, a guide face 57 for an endless flexible contact band 60. Four parallel, elongated openings 62, 63, 64 and 65 for the discs 66, 67, 68 and 69 of a measuring wheel 70 are provided in the aforementioned guide face 57. The peripheral surfaces of the discs 66-69 are knurled, as indicated for the disc 66 in FIG. 1, to increase the friction coefficient between the peripheral surfaces of the aforementioned discs and the rear face of the contact band 60. The contact band 60 may be constituted by an endless strip of textile material provided on opposite surfaces with a layer of rubber, vulcanized thereto. In order to increase the friction coefficient between the contact band 60 and the material 25, the length of which has to be measured, the contact band is provided at its outer surface thereof with a plurality of small projections 73 uniformly distributed over the outer surface of the contact band 60.

Opposite transverse edges 75 and 76 of the frame 45 define, with corresponding edges 77 and 78 of the opening 47, slots 79 and 80 through which the contact band 60 passes. The tips of the projections 73 in the region of the guide face 57 are located slightly above the support surface 23, in order to assure a good frictional engagement between the material 25 and the contact band 60. Due to this frictional engagement, the contact band 60 is taken along by the material 25 in the direction indicated by the arrow 33. The contact band 60, in turn, takes the measuring wheel 70, fixed to the shaft 83, along by friction, so that rotation of the shaft 83 is an indication of the length of the material 25 movable over the support surface 23. The shaft 83 is coupled to a measuring mechanism of known construction, not shown in the drawing, and provided with an indicator for indicating the length of the material depending on the number of revolutions of the shaft 83.

Since the contact band 60 engages the rear face 85 of the material 25 to be measured over a large area, an exact length measuring is also assured if the rear face 85 is for instance provided with a waffle pattern or otherwise profiled.

The upper face 87 of the material 25 is engaged by pressure means 90, provided with a plurality of discs 91 arranged opposite the discs 66-69 of the measuring wheel 70.

As shown in FIG. 3, the pressure means 90 may be constituted by a roller turnable about a shaft 93, which is carried by an arm 97 tiltable about a pivot 95 stationarily arranged on a frame of the machine, only partly indicated in FIG. 3.

As further shown in FIG. 3, a shaft 99, extending between the side walls 35 and 36 of the housing 30, carries reversing means in form of a roller 100 which engages the inner surface of the contact stand 60, opposite the portion of the latter which is in engagement with the material 25, for properly guiding the contact band 60.

FIGS. 4 and 5 illustrate a second embodiment of a length measuring device according to the present invention. As shown in these two Figures, the second embodiment includes a carrier arm 105 tiltable about a fixed pivot 103 and comprising two side bars 108 and 109 connected by a cross member 107. A tension spring 103 is connected at opposite ends to the side bar 109 and a fixed point 110, so that the tension spring 113 biases the carrier arm 105 toward the material 25, the length of which is to be measured. A shaft 115 of the measuring wheel 70 is turnably mounted on the carrier arm 105 between the side bars 108 and 109 of the latter, whereas the roller 100 of the reversing means for the endless contact band 60 is turnably on a shaft 116 carried by upwardly projecting portions of the side bars of the carrier arm 105. A frame 120, extending transverse to the direction of movement 33 of the material 25, is connected to the lower ends of the side bars 108 and 109. The frame 120 is provided with a plurality of elongated parallel openings 121, 122, 123 and 124, best shown in FIG. 5, for the discs of the measuring wheel 70 and the frame is further provided with a guide face 127, extending substantially parallel to the support surface 23, for the contact band 60.

An opening 129 is provided in the support surface 23 below the measuring wheel 70. Roll-shaped pressure means 90, which are turnably mounted on a fixed shaft 130, extend through the opening 129 into engagement with the face of the material 25 sliding along the support surface 23.

Figure 7:
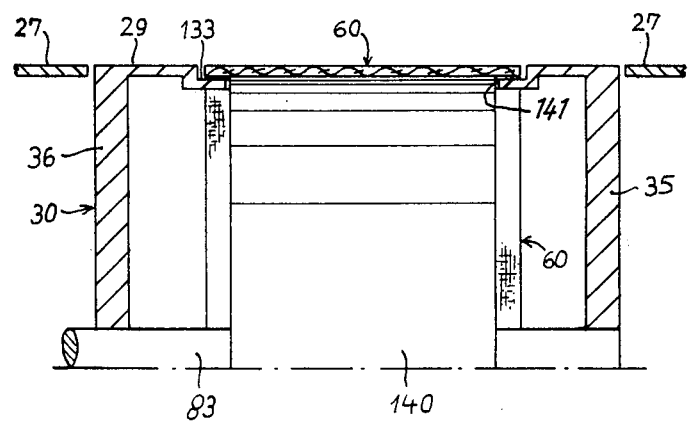
FIG. 7 is a cross-section taken along the line VII—VII of FIG. 6.
Figure 8:
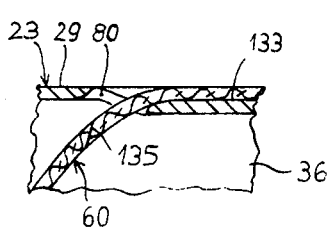
FIG. 8 is a cross-section taken along the line VIII—VIII of FIG. 6 and drawn to an enlarged scale.

FIGS. 7-8 illustrate a third embodiment of a length measuring device according to the present invention. A guide face 133 for the contact band 60 is machined into the top wall of the housing 30 slightly below the upper surface 29 of the top wall, so that the outer surface of the contact band 60 extends only slightly beyond the upper surface 29 of the housing 30 and therewith beyond the support surface 23. The slots 79 and 80 for the passage of the contact band 60 therethrough are formed as openings between the upper surface 29 and the guide face 133. In this case two ends of the contact band 60 have to be connected in any convenient manner along a connecting surface 135 as shown in FIG. 8.

Figure 6:
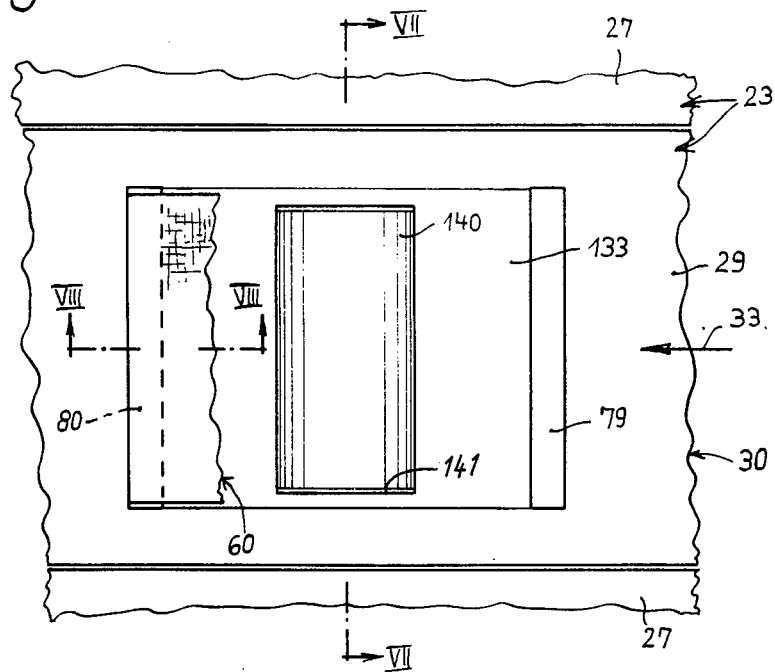
FIG. 6 is a top view of a third embodiment of the measuring device without a frame and in which the pressure means are omitted for clarity sake.

In this embodiment the measuring wheel 140 has a cylindrical peripheral surface and the measuring wheel is fixedly carried by the shaft 83 and extends through an opening 141 in the guide face 133. The pressure means for pressing the material to be measured against the peripheral surface of the measuring wheel 140, is not shown in FIGS. 6-8 and it can be constructed likewise as a cylindrical roller or as a roll structure provided with a plurality of discs as for instance shown in FIG. 2.

It will be understood that each of the elements described above, or two or more together, may also find a useful application in other types of devices for measuring the length of webs differing from the types described above.

While the invention has been illustrated and described as embodied in a device for measuring the length of a web such as a floor covering or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for measuring the length of a web, such as a floor covering or the like, having a front face and a rear face, comprising support means having a planar support surface adapted to support one of the faces of a web movable in longitudinal direction over said support surface, said support surface being formed with a first opening therethrough; an endless flexible contact band having an outer face frictionally engaging the rear face of the web; guide means having a substantially planar guide face extending parallel to and spaced from said support surface for guiding a portion of said flexible contact band parallel to said support surface; a measuring wheel having an axis of rotation normal to the direction of movement of the web and engaging a face of said portion of said endless flexible band opposite said outer face; and a pressure means arranged opposite said measuring wheel and cooperating with the latter for pressing the web into engagement with said outer face of said contact band, said guide face being formed with at least one second opening opposite said pressure means through which a portion of said measuring wheel extends into engagement with said opposite face of said contact band.

2. A device as defined in claim 1, wherein said pressure means comprises a roller having an axis of rotation parallel to and vertically aligned with that of said measuring wheel.

3. A device as defined in claim 1, wherein said measuring wheel is arranged on the side of said support surface which faces away from the web.

4. A device as defined in claim 3, wherein said first opening is in part defined by two first edges extending normal to said direction and located spaced from and to opposite sides of a plane normal to said support surface and including the axis of said measuring wheel and wherein said guide face is in part defined by two second edges respectively extending spaced from and substantially parallel to said first edges, said first edges forming with the respective second edges a pair of narrow slots through which said endless flexible contact band passes.

5. A device as defined in claim 4, wherein said second edges are rounded off in the direction of curvature of said endless flexible contact band.

6. A device as defined in claim 1, wherein said guide means comprise a frame arranged in said opening of said support surface, said frame having a face substantially parallel to said support surface and constituting said guide face.

7. A device as defined in claim 1, wherein said measuring wheel is arranged on the side of said support surface which faces the web.

8. A device as defined in claim 7, and including means mounting said measuring wheel movable toward and away from said support surface and a frame fixed to said mounting means, said frame having a face constituting said guide face.

9. A device as defined in claim 8, and including biasing means connected to said mounting means for biasing said measuring wheel and said face of said frame toward said support surface.

10. A device as defined in claim 1, and including reversing means for said contact band arranged in the region of the latter opposite the portion thereof which engages the web.

11. A device as defined in claim 1, wherein said outer face of said contact band and the peripheral surface of said measuring wheel are constructed to provide a high friction coefficient between said contact band and the web, on the one hand, and between the contact band and the measuring wheel, on the other hand.

* * * * *